US006449823B2

(12) United States Patent
Krapp

(10) Patent No.: US 6,449,823 B2

(45) Date of Patent: Sep. 17, 2002

(54) GOLF CLUB HEAD REMOVAL TOOL

(76) Inventor: John K. Krapp, 904 Belmont, Davenport, IA (US) 52804

( * ) Notice: Subject to any disclaimer, the term of this patent is extended or adjusted under 35 U.S.C. 154(b) by 0 days.

(21) Appl. No.: 09/726,728

(22) Filed: Nov. 30, 2000

Related U.S. Application Data

(60) Provisional application No. 60/188,763, filed on Mar. 13, 2000.

(51) Int. Cl.[7] ................................................ B23P 19/04

(52) U.S. Cl. ............................ 29/244; 29/263; 29/279; 29/239

(58) Field of Search .......................... 29/244, 263, 270, 29/235, 256, 240, 255, 238, 283, 283.5, 279, 239

(56) References Cited

U.S. PATENT DOCUMENTS

| | | | |
|---|---|---|---|
| 4,317,986 A | 3/1982 | Sullivan | |
| 4,783,893 A | 11/1988 | Farino | |
| 4,899,430 A | 2/1990 | Farino | |
| 4,901,418 A | 2/1990 | Machado et al. | |
| 4,910,849 A | 3/1990 | Marshall | |
| 5,687,464 A | 11/1997 | Marshall | |
| 5,722,140 A | 3/1998 | Marshall | |
| 5,839,181 A * | 11/1998 | Chu | 29/283 |
| 5,870,815 A * | 2/1999 | Karner et al. | 29/407.1 |

* cited by examiner

*Primary Examiner*—Joseph J. Hail, III
*Assistant Examiner*—Lee Wilson
(74) *Attorney, Agent, or Firm*—Henderson & Sturm LLP

(57) ABSTRACT

A tool is provided for operating on golf clubs to separate the clubhead from the shaft. A cylindrical housing is provided open at both ends. A coil spring is deployed within the housing. A piston sleeve also is deployed within the housing and against the spring. The golf club shaft is received through the piston sleeve and coil spring and secured as by a vise. When the golf club is heated in the area of the hosel, the coil spring is released, causing the piston sleeve to push against the clubhead, separating the same from the shaft.

2 Claims, 10 Drawing Sheets

GOLF CLUB HEAD REMOVAL TOOL

CROSS-REFERENCE TO RELATED APPLICATIONS

This application is a continuation of commonly owned U.S. Provisional Application No. 60/188,763, filed Mar. 13, 2000, now abandoned entitled Golf Club Head Removal Tool. Priority is claimed under 35 U.S.C. §119(e). The contents of the same are expressly incorporated herein by reference.

STATEMENT REGARDING FEDERALLY SPONSORED RESEARCH OR DEVELOPMENT

Not Applicable

AUTHORIZATION PURSUANT TO 37 C.F.R. §1.71(d)(e)

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates generally to the field of golf and tools employed to operate on golf equipment, and more particularly to tools employed on golf clubs to pull or remove or extract the golf club shaft from the clubhead.

2. Description of the Related Art

Golf is a popular form of summer recreation. Golfers constantly seek ways to improve their game. This includes updating their equipment from time to time. In one particular, as golf clubheads advance in design, or golf shafts advance in design, golfers will desire to have the latest technologies incorporated into their clubs. Therefore, golfers will have their clubs taken apart from time to time for this purpose.

Various shaft pullers have been devised to assist with this task. An example is found in U.S. Pat. No. 5,687,464 to Marshall. A hosel push member is placed against the hosel area of the club head. An externally threaded guide tube receives the golf club shaft and is positioned against the hosel push member. A drive member push member is threaded onto the guide tube, and a drive member coil spring is fitted over the guide tube and extends between the drive member push member and the hosel push member. A stop member butts against the guide tube and grasps the shaft to secure the golf club in the apparatus. Rotation of the drive member push member causes the drive member coil spring to act against the hosel push member to effect removal of the club head. The problem with this apparatus is that the coil spring maximum spring rate becomes employed only in instances where the golf club being worked on has a shaft penetration into the club head equal to the coil spring maximum deflection. Another problem is that because the shaft penetration into the golf club head can vary from ⅜" to 1½" depending on club type and brand, the coil spring deflection is not controllable. An additional problem with this apparatus is the great number of components which must be assembled, then disassembled, involving a large number of operational steps, each and every time a golf club is worked on. Furthermore, manual rotation of the drive member push member can cause great discomfort to the user. These and additional deficiencies of the apparatus give rise to a need for an improved golf club head removal tool.

What is needed is a spring loaded device that can utilize its maximum spring rate (lbs. of pressure) each and every time it is used.

What is needed is a spring loaded device that can also control its spring deflection (length the spring will deflect) regardless of the depth of the shaft penetrating the hosel.

There is also a need for a spring loaded device that has more pushing power than earlier models of shaft pullers.

There is a need for a spring loaded device with a minimum pushing power of around 75 lbs. at the end of the spring's deflection.

A need also exists for a spring loaded device that does not require multiple steps to assemble each and every time it is used.

There is a need for a spring loaded device that does not require multiple steps to disassemble each and every time it is used.

There is also a need for a spring loaded device which occupies less space than shaft pullers heretofore known.

There is a need for a shaft puller that requires less strength and is less painful to operate than prior models.

A need exists for a spring loaded device that is completely assembled and ready to operate.

A need exists for a spring loaded device which reduces loss of parts.

There is additional need for a spring loaded device that is easier and less expensive to manufacture.

There is a need for a spring loaded device that is safer to operate.

There is a need for a spring loaded device more conveniently usable in that there is no need to measure the spring deflection with a tape measure.

There is a need for a spring loaded device usable by golf club builders having a wide range of skills.

A need exists for a spring loaded device that can be readily attached to the golf builders vice.

There is a need for a spring loaded device that the operator cannot compress the spring beyond its capability therefore damaging the spring.

Therefore, those familiar with these and other problems recognize the need for a golf club head removal tool to enable a user to more readily effect repairs or alterations to golf clubs.

BRIEF SUMMARY OF THE INVENTION

The present invention discloses a golf club head removal tool.

A tool is provided for operating on golf clubs to separate the clubhead from the shaft. A cylindrical housing is provided open at both ends. A coil spring is deployed within the housing. A piston sleeve also is deployed within the housing and against the spring. A guide slot formed in the housing receives a guide block fixed to the piston sleeve. The housing includes a tensioning bolt which engages the guide block. The golf club shaft is received through the housing, the piston sleeve and coil spring and secured as by a vise. When the golf club is heated in the area of the hosel, the coil spring is released, causing the piston sleeve to push against the clubhead, separating the same from the shaft.

An alternative embodiment of the present invention includes providing the housing with a tube member which can be secured in a vise or the like.

An object of the present invention is the provision of a tool which meets the aforementioned needs.

Other objects, advantages, and novel features of the present invention will become apparent from the following detailed description of the invention when considered in conjunction with the accompanying drawings.

DETAILED DESCRIPTION OF THE INVENTION

Figure 1:
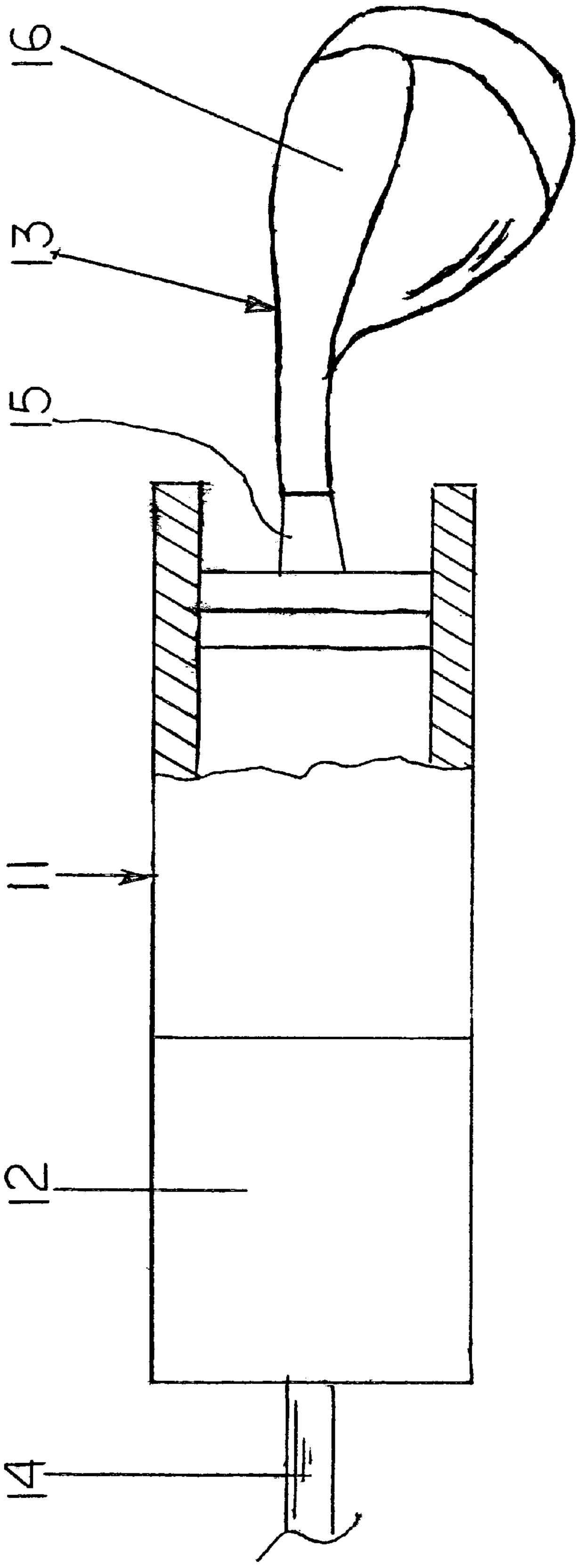
FIG. 1 is a fragmentary elevational view, partly cut away, showing the tool of this invention applied to a golf club.
Figure 2:
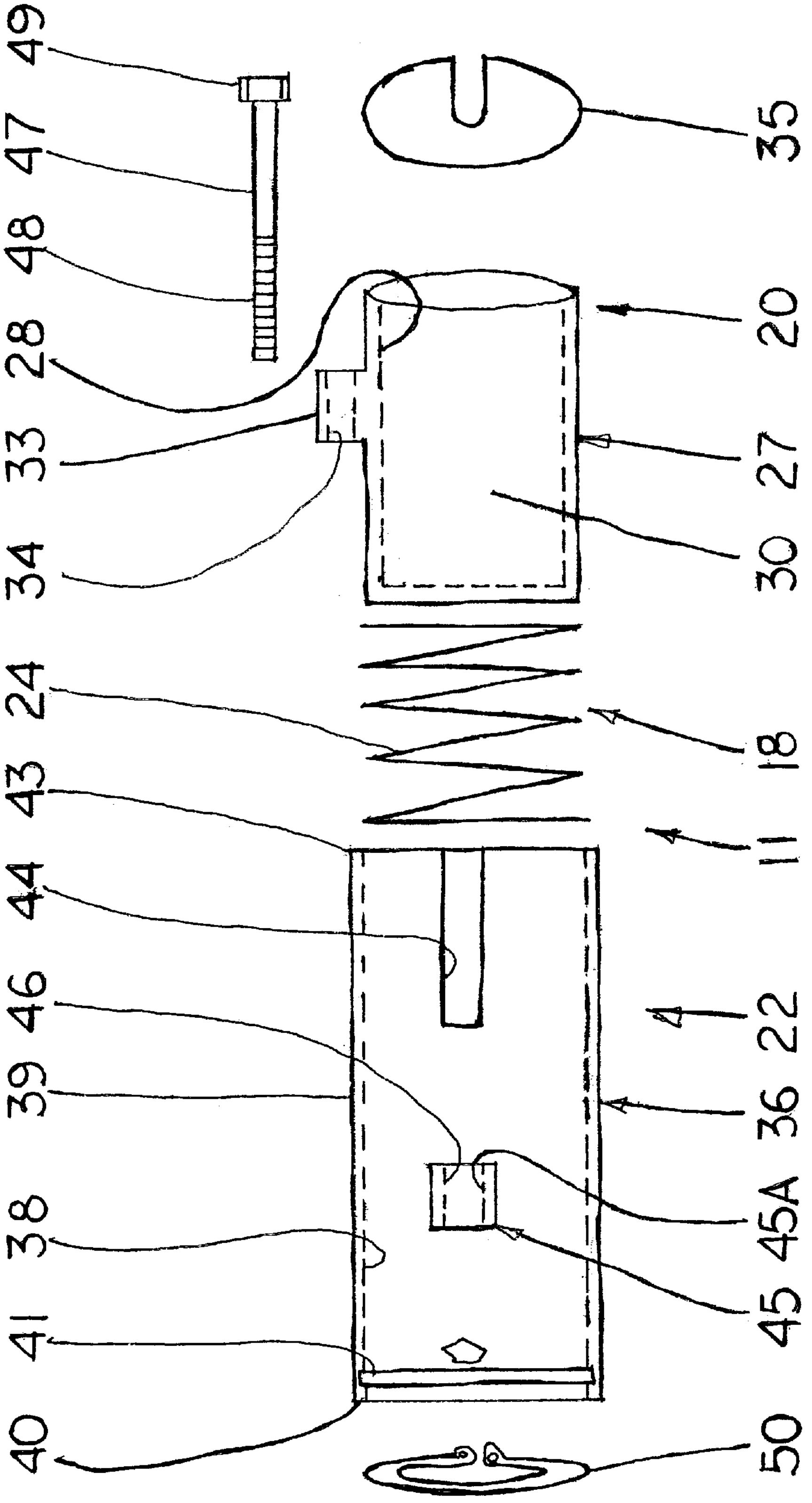
FIG. 2 is an exploded schematic view of the tool of this invention.

Referring now to the drawings, wherein like reference numerals designate identical or corresponding parts throughout the several views, FIG. 1 shows the golf club head removal tool of this invention generally at (11) employed together with a vise (12) to operate on a golf club (13) comprised of a shaft (14), hosel area (15) and clubhead (16). Referring also to FIG. 2, the tool (11) includes a spring member (18) and piston member (20) deployed within a housing assembly (22).

Figures 3, 4, 5, 6, 7, 8, 9:
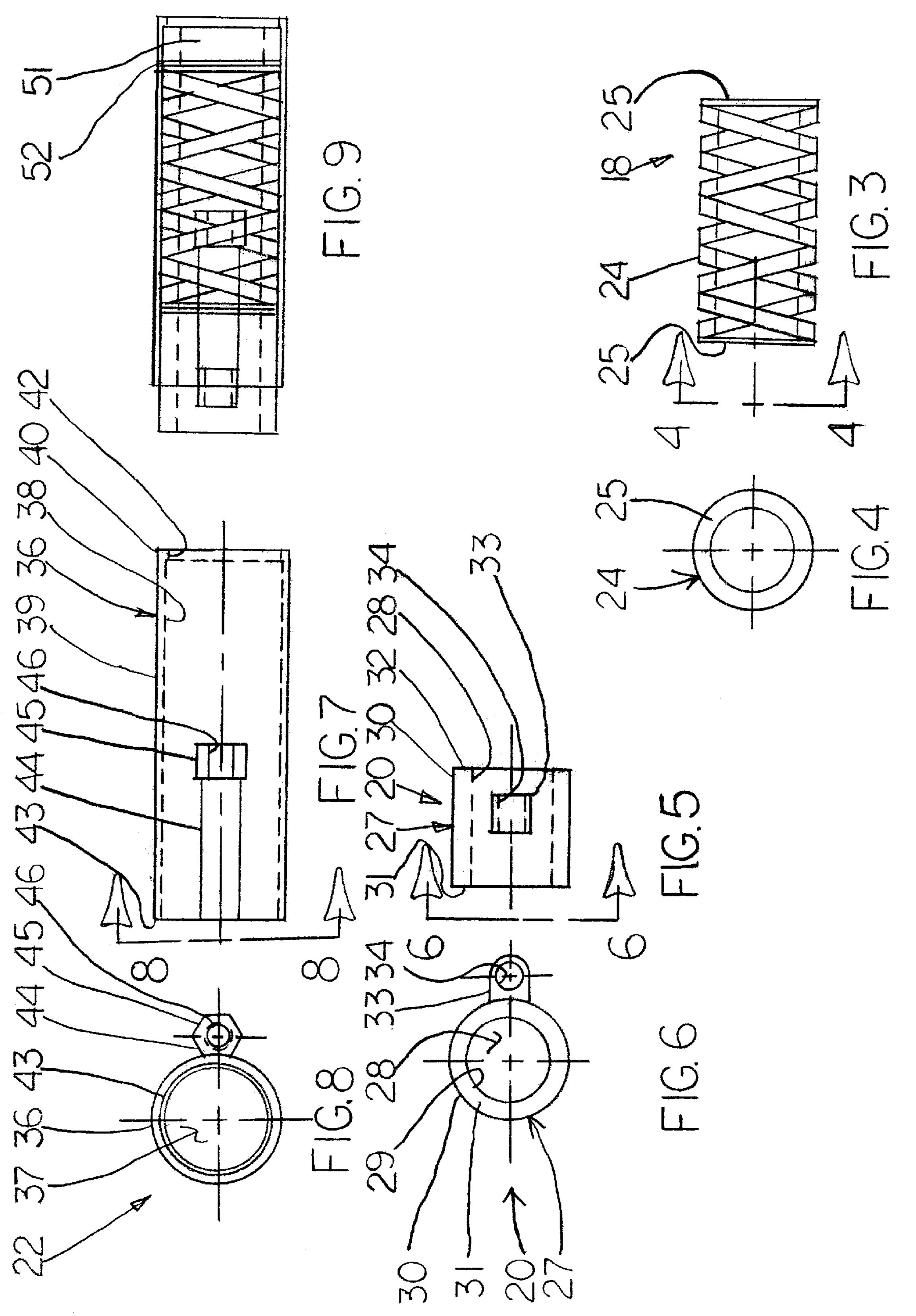
FIG. 3 is a side elevational view of the spring member of the tool.
FIG. 4 is an end elevational view taken along line 4—4 in FIG. 3.
FIG. 5 is a side elevational view of the piston member of the tool.
FIG. 6 is an end elevational view taken along line 6—6 of FIG. 5.
FIG. 7 is a side elevational view of the housing of the tool.
FIG. 8 is an end elevational view taken along line 8—8 of FIG. 7.
FIG. 9 is an elevational view showing partial assembly of the spring and piston members into the tool housing.

Referring more particularly to FIGS. 3 and 4, the spring member (18) includes a compression spring (24). Flattened surfaces (25) are formed at each end of the spring (24).

Referring next to FIGS. 5 and 6, the piston member (20) includes a cylindrical sleeve (27) having a longitudinal bore (28) and interior and exterior wall surfaces (29, 30). First and second annular pressure surfaces (31, 32) are formed at opposite ends of the sleeve (27). A guide block (33) is fixed to the exterior wall surface (30), relatively closer to second pressure surface (32), and a bore (34) is formed through guide block (33) parallel to bore (28). The piston member (20) further includes a slotted magnetic washer (35) disposed against second pressure surface (32).

Referring further to FIGS. 7 and 8, the housing assembly (22) includes a cylindrical housing (36) having a longitudinal bore (37) and interior and exterior wall surfaces (38, 39). The housing (36) has a first end surface (40), and a groove (41) is formed into interior wall surface (38) adjacent end surface (40). See FIG. 2. The plane defined by groove (41) is perpendicular to the axis of bore (37). The end (40) may be enlarged by addition of a lip structure (42), see FIG. 7, to be used in conjunction with, or as a substitute for, the groove (41).

The housing (36) includes a second end surface (43). The guide slot (44) is formed into housing (36) by a cut out beginning at the second end (43) and extending part way toward first end (40) parallel to the bore (37) long axis. A hex nut member (45) with threaded bore (46) is fixed to exterior wall surface (39) such that the axis of threaded bore (46) is parallel to the guide slot (44). The hex nut member (45) preferably is disposed intermediate first end (40) and the guide slot (44), see FIG. 2, although the member (45) may be otherwise positioned such as adjacent to slot (44), see FIG. 9.

The housing assembly (22) further includes an elongated bolt (47). A threaded length (48) is formed on the bolt adjacent one end and an Allen head (49) is disposed at the opposite end of the bolt (47).

Figure 10:
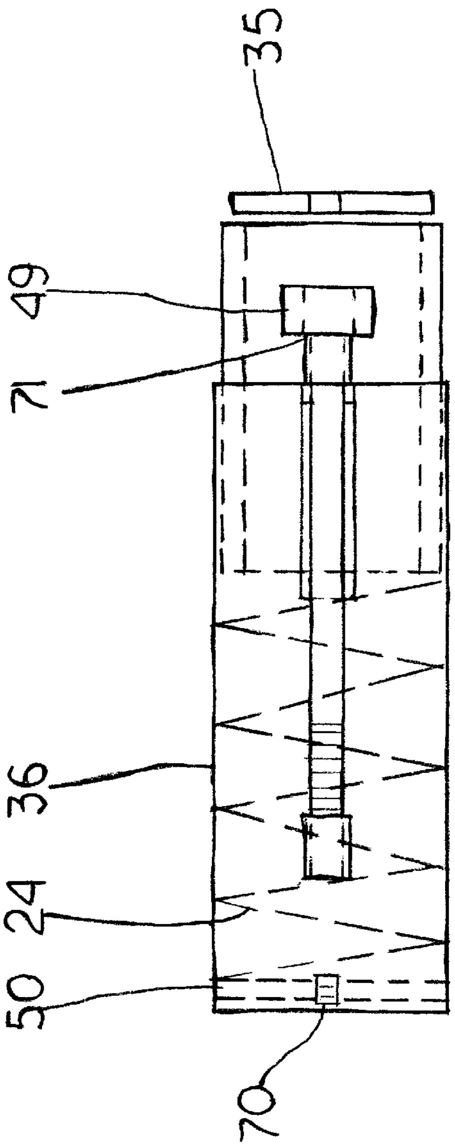
FIG. 10 is an elevational view showing further assembly of tool housing components.

A spring washer (50) is inserted into the groove (41), see FIG. 2. In the alternative, an annular spacer (51) is inserted into housing (36) against lip (42), and a washer (52) is placed against the spacer (51), see FIG. 9. The spring (24) is inserted into housing (36) such that one flattened end surface (25) butts against spring washer (50), see FIGS. 2 and 10, or in the alternative butts against washer (52), see FIG. 9. Piston (20) is inserted into housing (36) such that first pressure surface (31) butts against the other flattened end surface (25) of spring (24). The guide block (33) fits into and projects through guide slot (44). The bolt (47) is passed through the bore (34) of guide block (33), and the threaded length (48) is threaded into bore (46) of the hex nut member (45). See FIG. 10.

Figure 12:
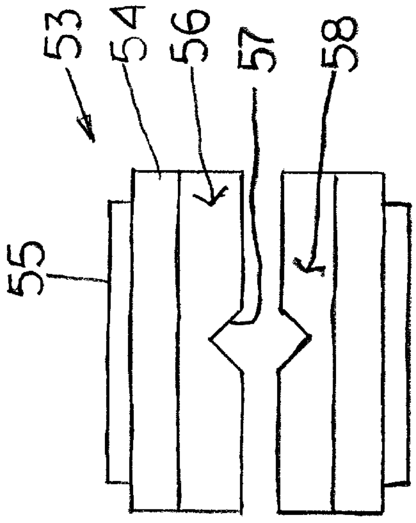
FIG. 12 is an end elevational view taken along line 12—12 of FIG. 11.
Figure 11:
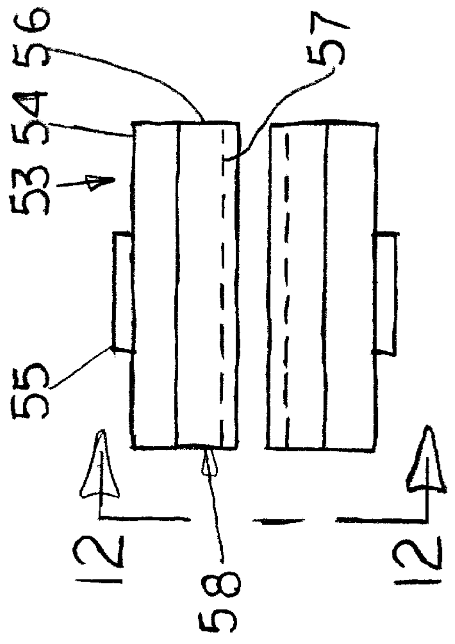
FIG. 11 is a side elevational view showing golf club shaft clamping structure.

The tool (10) also includes golf club shaft clamping structures (53). See FIGS. 11 and 12. Each structure (53) has a steel plate (54) bearing on one side a magnetic strip (55) and on the opposite side a rubber clamping pad (56). A longitudinal groove (57) is formed into the pad (56). The structures (53) in use are disposed so that the clamping pads (56) are facing each other and the grooves (57) are aligned. The golf club shaft (14) has been passed through the assembled spring member (18), piston member (20) and housing assembly (22), such that the club head (16) is adjacent the housing second end (43) and the shaft (14) is projecting beyond the housing first end (40). The clamping structures (53) are brought together such that the shaft (14) is captured within the channel formed by the grooves (57). The vise (12) engages strips (55) to tighten the structures (53) against the shaft (14). The housing first end surface (40) butts against an end surface (58) of the clamping structures (53) at that time.

Figure 13:
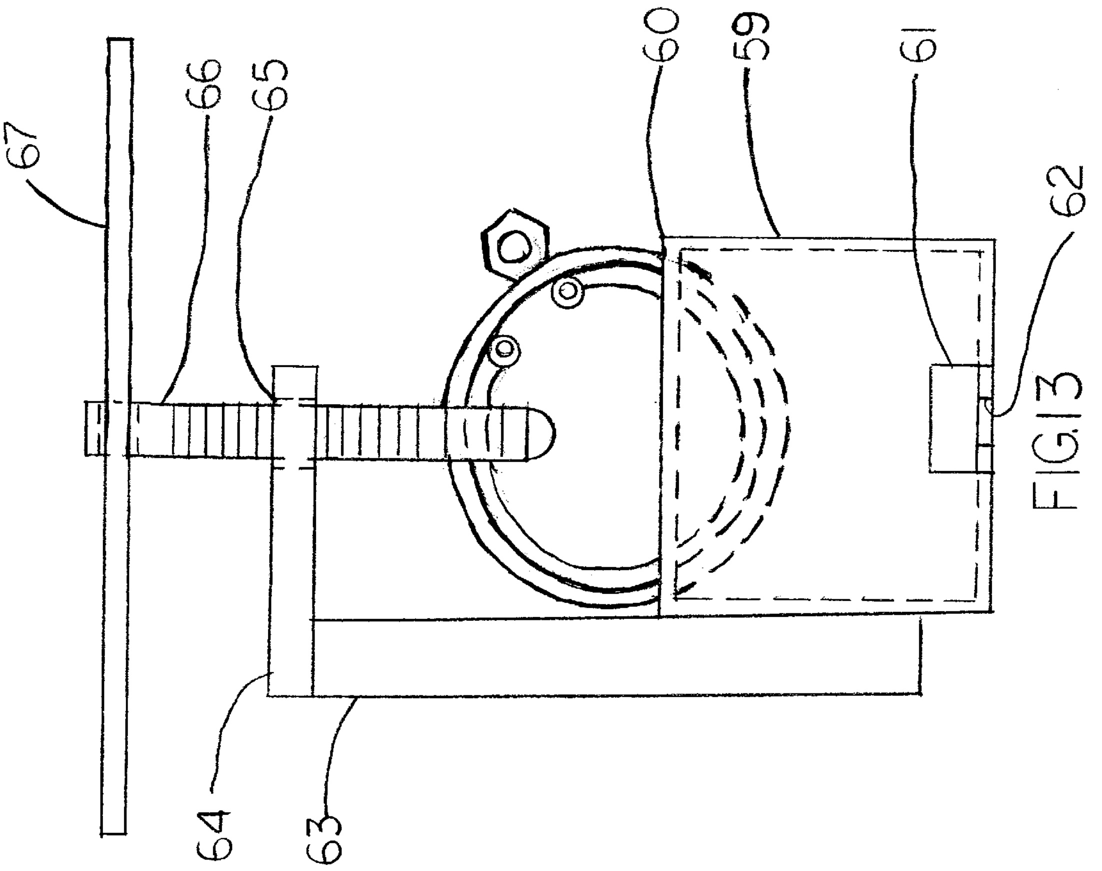
FIG. 13 is a schematic, end elevational view of a preferred embodiment of the tool of this invention.
Figure 18:
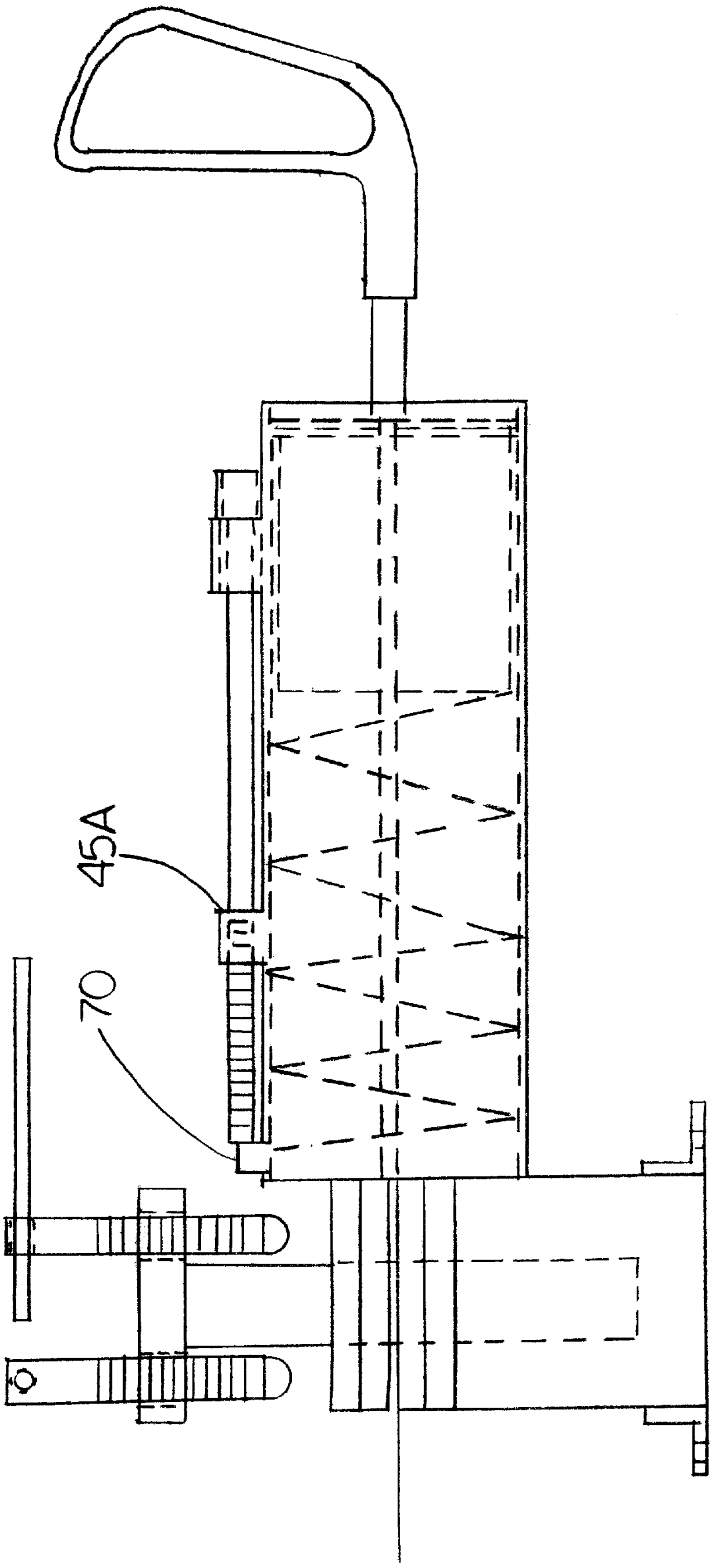
FIG. 18 is a schematic, side elevational view similar to FIG. 15 but showing an embodiment with multiple clamping bolts.

Referring to FIG. 13, the presently preferred embodiment of the tool (11) employs a housing assembly (22) having a square tubing (59) fixed normal to the housing (36) at the first end surface (40), but leaving the housing first end mostly open. The tubing (59) includes a support plate (60) at the end adjacent the housing (36) and at the opposite end has flanges (61), with bores (62) to accommodate bolts (not shown) or the like for attachment to a work table (not shown). An extension (63) is fixed to one side of tubing (59) and projects beyond support plate (60). A transverse member (64) is supported by the extension (63) parallel to, and spaced apart from the support plate (60). One or more threaded bores (65) formed through the transverse member (64) supports one or more threaded clamping bolts (66) perpendicular to the support plate (60). See FIG. 18. A lever arm(s) (67) is supplied to actuate the clamping bolt(s) (66).

Figure 14:
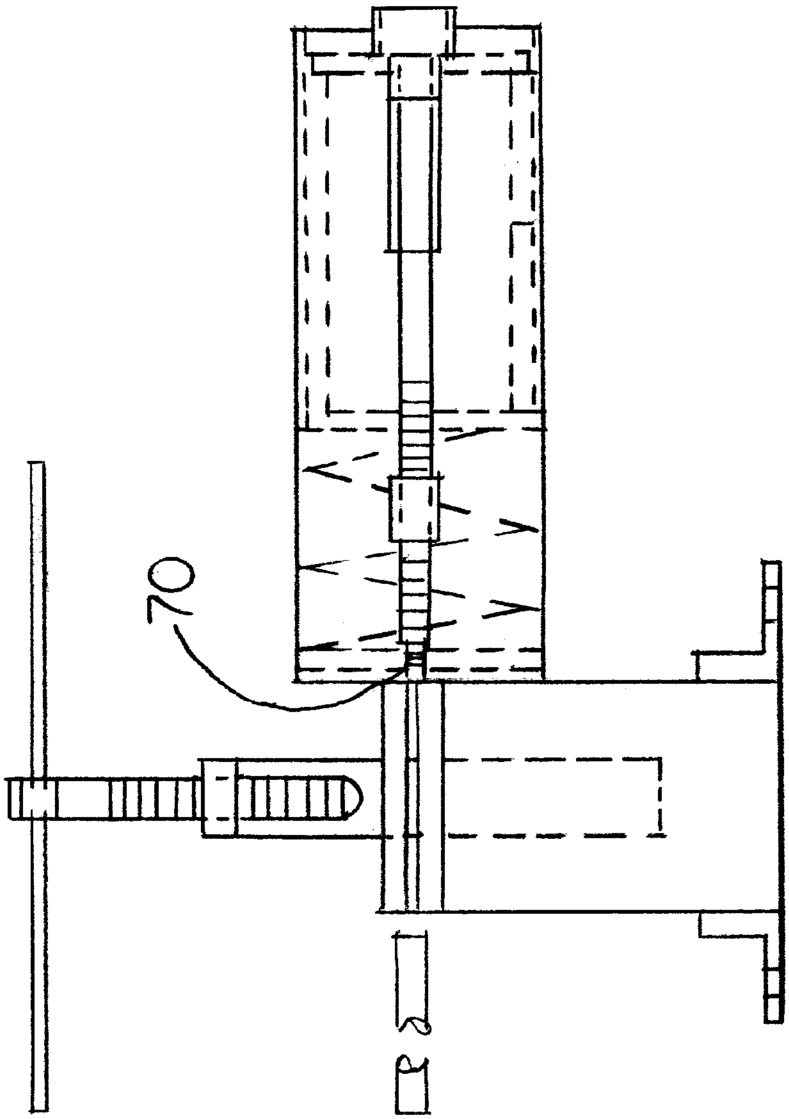
FIG. 14 is a schematic, side elevational view of the preferred embodiment of the tool showing tensioning of the spring member.
Figure 15:
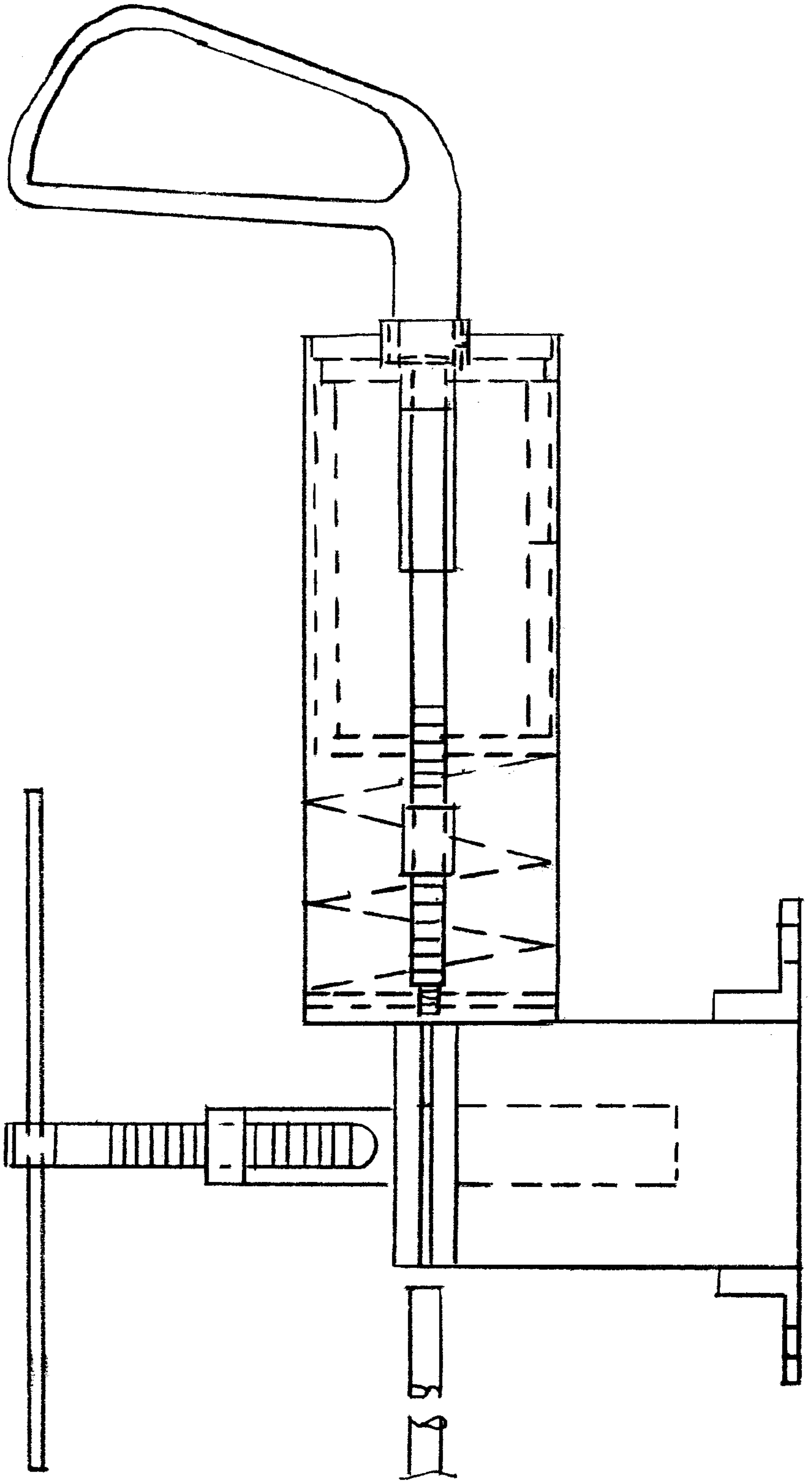
FIG. 15 is a schematic, side elevational view of the preferred embodiment of the tool showing insertion of the golf club into the tool.

When the preferred tool (11) is employed, the spring member (18) is tensioned by actuation of the bolt (47). Referring to FIG. 14, the user more specifically engages the Allen head (49), such as with a cordless drill, ratchet, or a 90 degree Allen wrench, and screws the threaded length (48) relatively farther through hex nut member (45). The Allen head (49) presses against guide block (33), causing the piston member (20) to move toward the spring member (18). The first pressure surface (31) of sleeve (27) pushes against flattened end surface (25) compressing spring (24) against spring washer (50). A stop member (70) may project from the housing (36) to help prevent over compression of the spring member (18). Furthermore, one or more washers (71), see FIG. 10, may be placed over the bolt (47) adjacent the head (49), to space the head (49) apart from the guide block (33), also to prevent over compression of the spring member The user then inserts the golf club (13) into the tool (11). More specifically, the golf club (13) is inserted handle end first into housing assembly (22) through the open end adjacent second end surface (43). The golf club shaft (14) is extended through bore (28) of sleeve (27), through the spring (24), through spring washer (50), and out the housing assembly (22) open end adjacent first end surface (40). The slotted washer (35) is placed on the shaft (14) adjacent the hosel (15), and the golf club (13) then is inserted farther such that the washer (35) butts against second pressure surface (32) of sleeve (27). See FIG. 15.

One clamping structure (53) is positioned on support plate (60), the groove (57) thereof being aligned such that the golf club shaft (14) rests in the groove (57). The second clamping structure (53) is positioned as previously described to capture the shaft (14) within the channel formed by the grooves (57) of the clamping structures (53). The user then engages the lever arm (67) to screw the clamping bolt (66) against the clamping structures (53) to grasp tightly the shaft (14).

Figure 16:
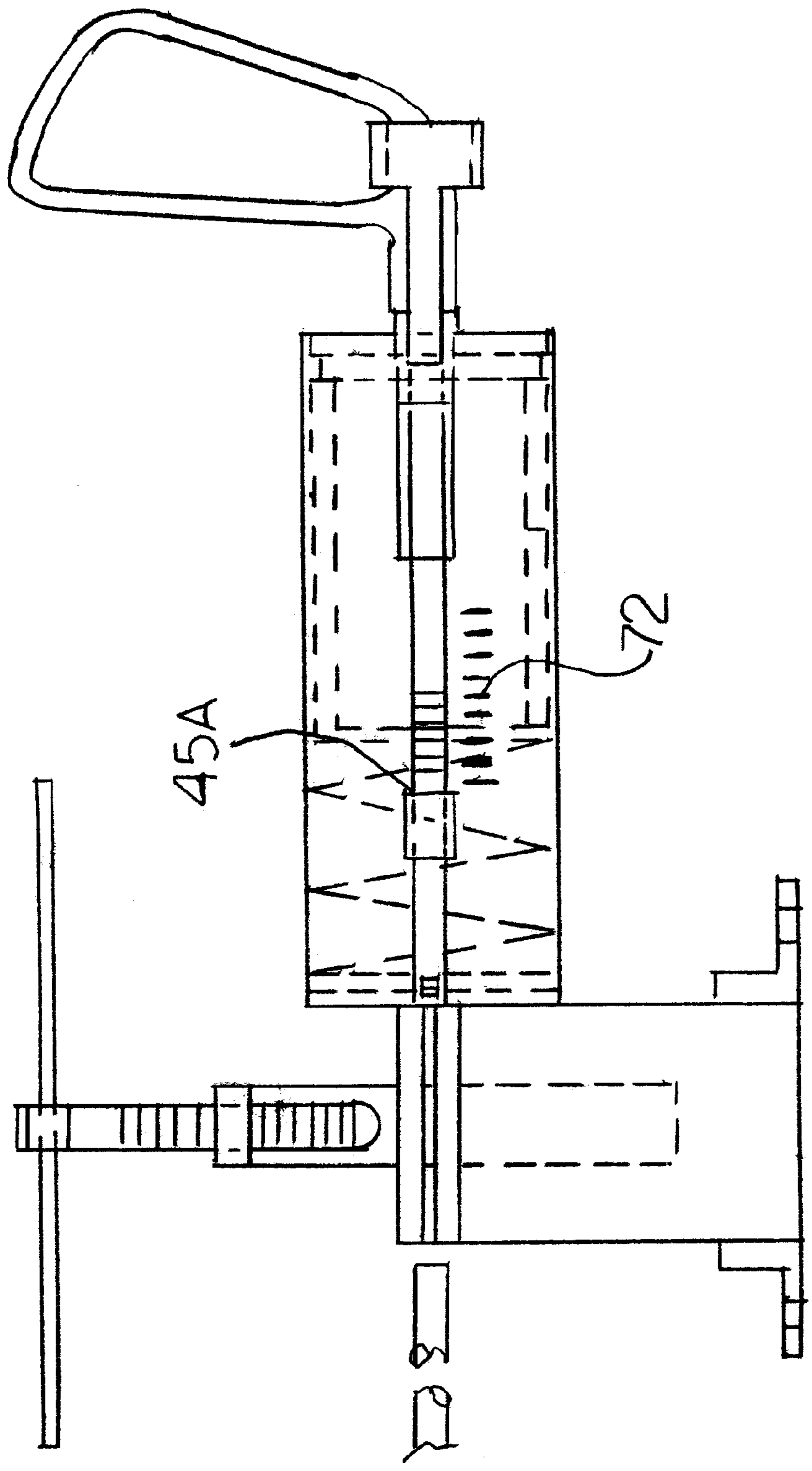
FIG. 16 is a schematic, side elevational view of the preferred embodiment of the tool showing release of the tensioning of the spring member.
Figure 17:
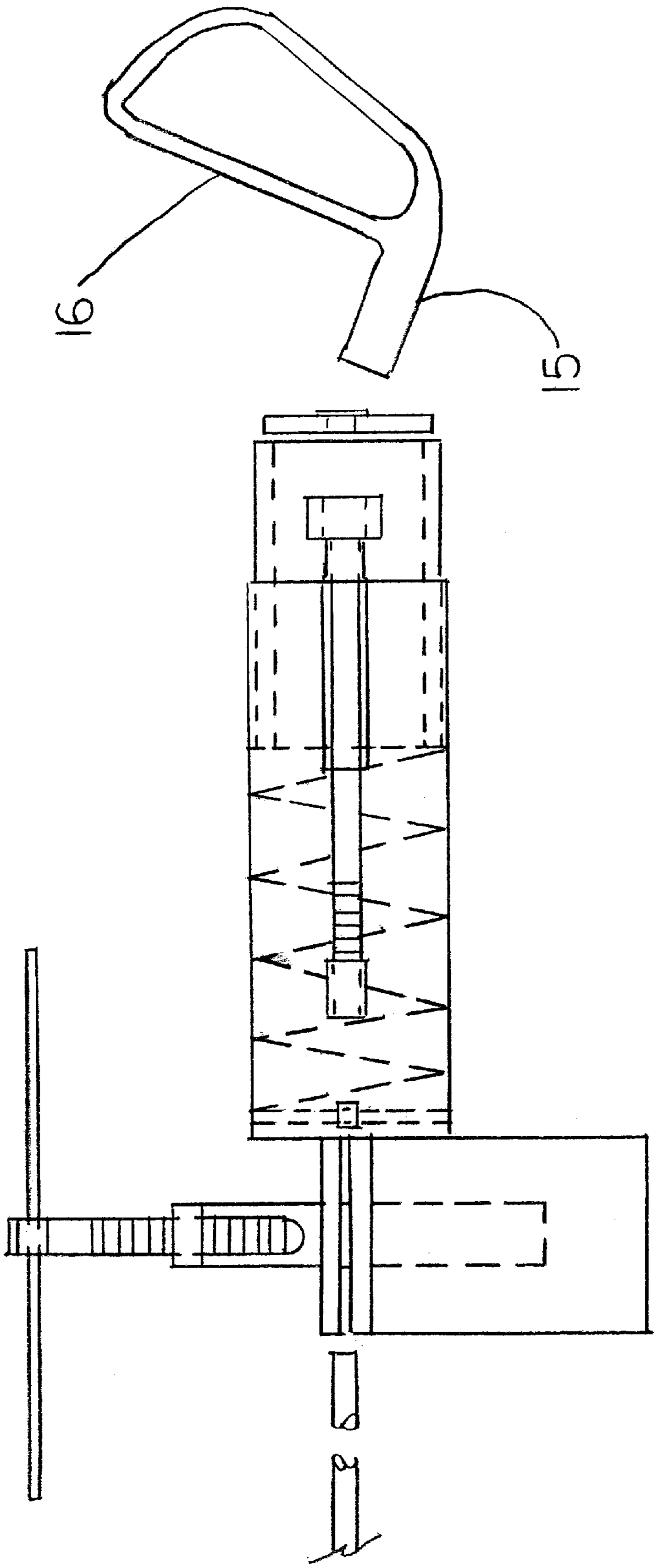
FIG. 17 is a schematic, side elevational view of the preferred embodiment of the tool showing removal of the club head by extension of the tool.

The user next reengages the Allen head (49) and unscrews the threaded length (48) back out of hex nut member (45) a distance equivalent to the penetration of the golf club shaft (14) into the club head (16) but not allowing the threads (48) of the bolt (47) to exit face (45A) of nut (45). See FIG. 16. A plurality of indicator marks (72) formed on the housing (36) facilitate backing out the bolt (47) without resort to use of a separate tape measure or the like.

The user then heats the golf club (13) in the area of the hosel (15) as is known in the art. As the adhesive melts, the club head (16) becomes moveable. The compressed spring (24) extends, pushing the sleeve (27) and slotted washer (35) against the hosel (15), moving the club head (16) off the shaft (14). The magnetic slotted washer (35) tends to remain on the sleeve (27). The bolt (66) then is moved away from the clamping structures (53), and the golf club shaft (14) then can be withdrawn from the tool (11).

The tool (11) as a spring loaded device uses its maximum spring rate (lbs. of pressure) each and every time it is used, because the spring member (18) is compressed to 100% of its maximum spring rate and 100% of its maximum deflection prior to insertion of the golf club.

The tool (11) as a spring loaded device controls its spring deflection (length the spring will deflect) regardless of the depth of the shaft penetrating the hosel, such that the spring member (18) is at 100% of its spring deflection.

The tool (11) as a spring loaded device has more pushing power than earlier models of shaft pullers. More specifically the tool (11) may be set to have a minimum pushing power of around 75 lbs. at the end of the spring (24) deflection by employing a spring (24) having a maximum spring deflection greater than required for removal of club heads, that is, greater than the maximum deflection allowed by the bolt (47), the extra length causing precompression of the spring (18) inside the housing (36).

The tool (11) is a spring loaded device that does not require multiple steps to assemble each and every time it is used. Nor does the tool (11) require multiple steps to disassemble each and every time it is used.

The tool (11) occupies less space than shaft pullers heretofore known.

The tool (11) requires less strength and is less stressful to operate than prior shaft pullers.

The tool (11) is deployed completely assembled and ready to operate. Furthermore, the tool (11) is operable in a fashion which reduces loss of parts.

The tool (11) is a spring loaded device that is easier and less expensive to manufacture.

The tool (11) is a spring loaded device that is safer to operate. Also, it is more conveniently usable in that there is no need to measure the spring deflection with a tape measure. Furthermore, operability is such that golf club builders of a wide variation in skills are able to use the tool (11).

The tool (11) can be readily attached to the golf builders vice.

The operation of the tool (11) is such that the operator cannot compress the spring (24) beyond its capability, thereby damaging the spring.

The golf club head removal tool (11) enables a user to more readily effect repairs or alterations to golf clubs.

The industrial applicability of the golf club head removal tool (11) is believed to be apparent from the foregoing description. Although only exemplary embodiments of the invention have been described in detail above, those skilled in the art will readily appreciate that many modifications are possible without materially departing from the novel teachings and advantages of this invention. Accordingly, all such modifications are intended to be included within the scope of this invention as defined in the following claims.

In the claims, means-plus-function clauses are intended to cover both equivalent structures and structural equivalents of the structures described herein as performing the claimed function.

I claim:

1. A tool, for use with a golf club having a clubhead and shaft, comprising:

a housing having first and second open ends;

a spring located within said housing, having first and second spring ends;

said spring first end disposed against said housing adjacent said housing first end;

a piston sleeve located within said housing, said piston sleeve having a first pressure surface and a second pressure surface, said first pressure surface disposed against said spring second end; and a tensioner extending between said housing and said piston sleeve, operable to press said piston sleeve against said spring, the golf club shaft being received through said housing, said piston sleeve and said spring, the clubhead being disposed adjacent said piston sleeve; and said tensioner further operable to release said piston sleeve, said spring then operable to press said piston sleeve against the clubhead.

2. The tool of claim 1 wherein said piston sleeve includes a guide block, said housing has a guide slot formed therein, said guide block projects through said guide slot, and said tensioner engages said guide block.

* * * * *